(12) United States Patent
Park et al.

(10) Patent No.: US 12,429,344 B2
(45) Date of Patent: Sep. 30, 2025

(54) CALL DISPATCH CONTROL SYSTEM AND CALL DISPATCH CONTROL SERVICE PROVIDING METHOD

(71) Applicants: Hyundai Motor Company, Seoul (KR); Kia Corporation, Seoul (KR)

(72) Inventors: Yunjoong Park, Seoul (KR); Jeongtaek Oh, Yongin-si (KR); Byeonghwi Choi, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 263 days.

(21) Appl. No.: 18/172,677

(22) Filed: Feb. 22, 2023

(65) Prior Publication Data

US 2024/0102812 A1    Mar. 28, 2024

(30) Foreign Application Priority Data

Sep. 22, 2022   (KR) .................. 10-2022-0119907

(51) Int. Cl.
*G01C 21/34*   (2006.01)
*G01C 21/36*   (2006.01)
*H04W 4/02*    (2018.01)

(52) U.S. Cl.
CPC ..... *G01C 21/3438* (2013.01); *G01C 21/3605* (2013.01)

(58) Field of Classification Search
CPC ........... G01C 21/3438; G01C 21/3605; G08G 1/202; G08G 1/205; G08G 1/123; B66B 1/18; G07C 5/008; B60R 25/241; H04W 4/02; G06Q 30/02; G06Q 10/06; G06Q 50/40

See application file for complete search history.

(56) References Cited

U.S. PATENT DOCUMENTS

| | | | | |
|---|---|---|---|---|
| 5,955,708 | A  * | 9/1999 | Amano ................. | B66B 1/18 |
| | | | | 187/383 |
| 6,456,207 | B1 * | 9/2002 | Yen ...................... | G08G 1/202 |
| | | | | 705/13 |
| 11,062,416 | B1 * | 7/2021 | Jang .................... | G06Q 50/40 |
| 11,248,919 | B2 * | 2/2022 | Shiga ................ | G01C 21/3605 |
| 2004/0106399 | A1 * | 6/2004 | Ki ........................ | G08G 1/202 |
| | | | | 455/445 |
| 2010/0253521 | A1 * | 10/2010 | Williams, Sr. ........ | G06Q 10/06 |
| | | | | 340/572.1 |
| 2011/0009098 | A1 * | 1/2011 | Kong ................... | G08G 1/202 |
| | | | | 455/457 |
| 2012/0203599 | A1 * | 8/2012 | Choi .................... | G06Q 30/02 |
| | | | | 705/13 |
| 2013/0196638 | A1 * | 8/2013 | Kim .................... | H04W 4/02 |
| | | | | 455/414.1 |

(Continued)

*Primary Examiner* — Yuri Kan
(74) *Attorney, Agent, or Firm* — SLATER MATSIL, LLP

(57) ABSTRACT

An embodiment method for providing a call dispatch control service includes receiving, by a call server, event information from a taxi terminal corresponding to an empty car signal indicating that a passenger has exited a vehicle or a driving signal indicating that the passenger has entered the vehicle, receiving, by the call server, a call request from a user terminal, and dispatching, by the call server, a call of the user terminal to the taxi terminal in response to the event information received from the taxi terminal indicating an empty car.

17 Claims, 4 Drawing Sheets

(56) References Cited

U.S. PATENT DOCUMENTS

| | | | | |
|---|---|---|---|---|
| 2014/0203951 A1* | 7/2014 | Moon | ................... | G08G 1/123 |
| | | | | 340/901 |
| 2017/0289773 A1* | 10/2017 | Yang | ..................... | B60R 25/241 |
| 2023/0286603 A1* | 9/2023 | Li | .......................... | G08G 1/205 |
| 2023/0382392 A1* | 11/2023 | Roberts | .................. | G07C 5/008 |

* cited by examiner

CALL DISPATCH CONTROL SYSTEM AND CALL DISPATCH CONTROL SERVICE PROVIDING METHOD

CROSS-REFERENCE TO RELATED APPLICATIONS

This application claims the benefit of Korean Patent Application No. 10-2022-0119907, filed on Sep. 22, 2022, which application is hereby incorporated herein by reference.

TECHNICAL FIELD

The present disclosure relates to a call dispatch control system and a call dispatch control service providing method.

BACKGROUND

A taxi transportation operator may use a call dispatch service when operating a taxi, but business of transporting passersby requesting a ride on the road without receiving a call dispatch is possible. In addition, even if the existing call dispatch service is used, it is also possible to transport passersby receiving a call dispatch through another call dispatch service.

In this way, during a taxi business that transports passersby without receiving a call dispatch service or transports passersby by receiving a call dispatch service through another call dispatch service, since an existing call dispatch service provider does not know that the taxi is already in operation, the provider continuously dispatches a call to the taxi.

Receiving a call continuously during the taxi business that transports passersby may reduce the satisfaction with a call dispatch service use due to noise caused by a dispatch notification sound and inefficiency caused by an unacceptable call dispatch.

In addition, allowing a taxi to receive a call dispatch only after arriving at its destination may result in a vacancy in the taxi business.

The above information disclosed in this background section is only for enhancement of understanding of the background of embodiments of the invention, and therefore it may contain information that does not form the prior art that is already known to a person of ordinary skill in the art.

SUMMARY

Embodiments of the present invention provide a call dispatch control system and a call dispatch control service providing method having advantages of increasing the satisfaction with a call service use of a taxi transportation operator when a taxi uses a call dispatch service, by controlling a call dispatch so that when the taxi is not capable of receiving the call dispatch, the call dispatch is not received, and when the taxi needs the call dispatch, the call dispatch is received.

Another embodiment of the present invention provides a call dispatch control service providing method including receiving, by a taxi terminal, an empty car signal indicating that a passenger has exited or a driving signal indicating that the passenger has entered from a driver of a vehicle, receiving, by a call server, event information from the taxi terminal, receiving, by the call server, a call request from a user terminal, and dispatching, by the call server, a call of the user terminal to the taxi terminal when the event information received from the taxi terminal is event information indicating an empty car.

The call dispatch control service providing method may further include, when the received event information is event information indicating that the vehicle is driving, excluding, by the call server, the taxi terminal from a candidate taxi terminal that may match with the user terminal based on current location information of the user terminal and destination information of a user.

The call dispatch control service providing method may further include receiving, by the taxi terminal, three or more of sensor signals respectively indicating a position of an accelerator pedal, a speed of the vehicle, an acceleration of the vehicle, a seat pressure, an opening/closing state of a vehicle door, and a position of a shift gear from an internal sensor of the vehicle, determining, by the taxi terminal, whether the passenger is in an entering state in which the passenger is entering the vehicle or the passenger is in an exiting state in which the passenger is exiting the vehicle, based on the sensor signals and whether an empty vehicle lamp of the vehicle turns on, and transmitting, by the taxi terminal, event information indicating the entering state or the exiting state to the call server according to a determination result.

The call dispatch control service providing method may further include dispatching, by the call server, a call of the user terminal to the taxi terminal, when the received event information is event information indicating the exiting state.

The call dispatch control service providing method may further include, when the received event information is event information indicating the entering state, excluding, by the call server, the taxi terminal from a candidate taxi terminal that may match with the user terminal based on current location information of the user terminal and destination information of a user.

The call dispatch control service providing method may further include receiving, by the call server, information indicating an estimated time required to arrive at a destination set in a navigation application installed in the taxi terminal, and a remaining distance to arrive at the destination from the taxi terminal, and dispatching, by the call server, the call of the user terminal to the taxi terminal at any time during a period from when the taxi terminal starts operating before arriving at the destination.

Yet another embodiment of the present invention provides a call dispatch control system including a taxi terminal located in a vehicle operating as a taxi, having a plurality of applications installed, and generating event information based on a signal input by a driver or a signal received from an internal sensor of the vehicle, and a call server, if a call request is received from a user terminal, dispatching a call of the user terminal to the taxi terminal when the event information received from the taxi terminal is first event information indicating an empty car or the event information is second event information indicating that the vehicle is in an exiting state where a passenger has exited the vehicle.

The call server may exclude the taxi terminal from a candidate taxi terminal that may match with the user terminal based on current location information of the user terminal and destination information of a user when the event information received from the taxi terminal is third event information indicating that the vehicle is driving or when the event information is fourth event information indicating that the vehicle is in an entering state where the passenger has entered the vehicle.

The plurality of applications may include a meter application calculating a taxi operation fee according to a location, a movement distance, and a movement time of the vehicle based on GPS information of the vehicle and generating the first event information when a driver of the vehicle inputs an empty car signal indicating that a passenger has exited the vehicle through the taxi terminal, and a call application transmitting the first event information to the call server through the taxi terminal when receiving the first event information from a controller.

The controller may receive three or more of sensor signals respectively indicating a position of an accelerator pedal, a speed of the vehicle, an acceleration of the vehicle, a seat pressure, an opening/closing state of a vehicle door, and a position of a shift gear from the internal sensor, receive an empty vehicle lamp signal indicating whether to turn on an empty vehicle lamp of the vehicle from the meter application, and determine whether the passenger is in an entering state in which the passenger is entering the vehicle or whether the passenger is in an exiting state in which the passenger is exiting the vehicle based on the plurality of sensor signals and the empty vehicle lamp signal.

The plurality of applications may include a navigation application providing a screen for inputting destination information of the passenger through the taxi terminal and a screen indicating a route to an input destination through the taxi terminal.

The call server may receive information indicating an estimated time required to arrive at the destination set in the navigation application and a remaining distance to arrive at the set destination, and dispatch a call of the user terminal to the taxi terminal at any time during a period from when the taxi terminal starts operating before arriving at the destination.

According to embodiments of the present disclosure, it may be determined whether or not to dispatch a call to a taxi using the fact that the taxi transportation operator uses the application-type meter, so that the call dispatch may not be received when operating the taxi operating without using the call dispatch service, thereby improving the satisfaction of the call dispatch service use.

According to embodiments of the present disclosure, the call dispatch service providing server may recognize whether the passenger has entered without a separate input by allowing the taxi to determine whether the passenger is in the entering state using various state information of the vehicle, thereby improving the efficiency of the call dispatch.

According to embodiments of the present disclosure, the vacancy of the call dispatch may be minimized by allowing the vehicle to receive the call dispatch even before arriving at a destination.

Figure 1:
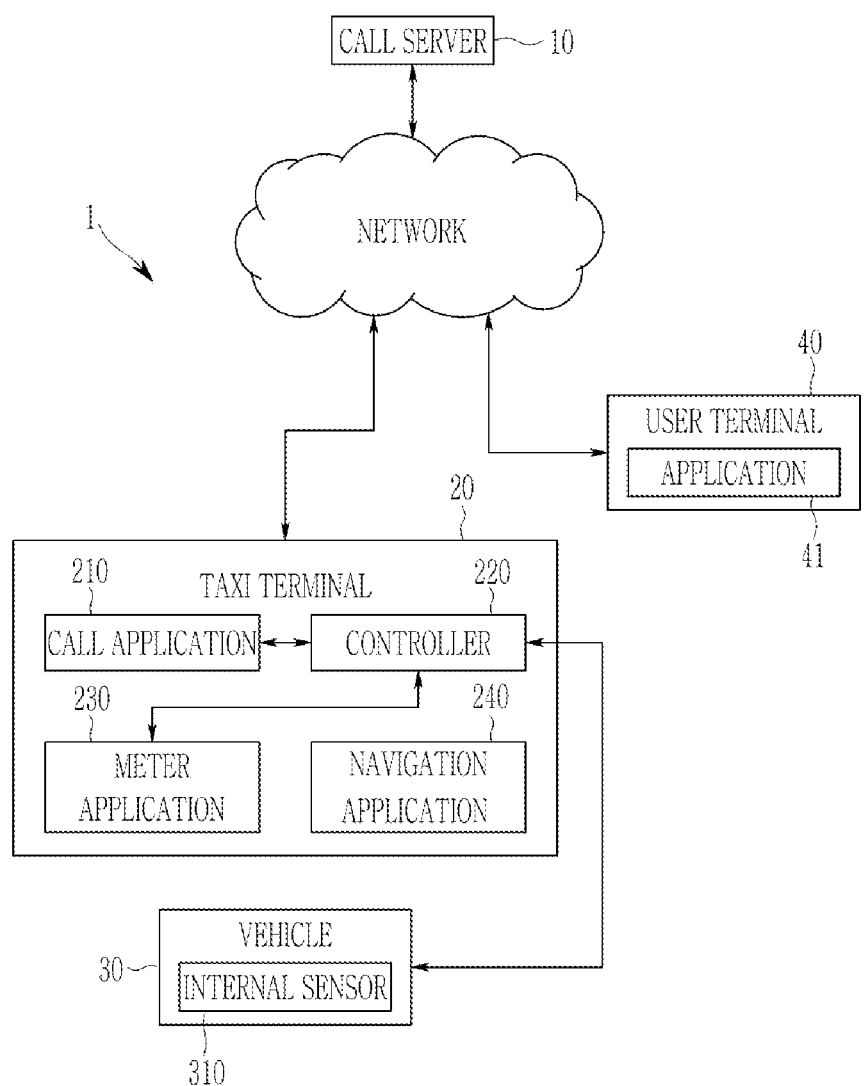
FIG. 1 is a block diagram schematically illustrating a configuration of a call dispatch control system according to an embodiment.

The following reference identifiers may be used in connection with the accompanying drawings to describe exemplary embodiments of the present disclosure.

1: call dispatch control system
10: call server
20: taxi terminal
210: call application
220: controller
230: meter application
240: navigation application
30: vehicle
310: internal sensor
40: user terminal
41: application

DETAILED DESCRIPTION OF ILLUSTRATIVE EMBODIMENTS

Hereinafter, the embodiments disclosed in the present specification will be described in detail with reference to the accompanying drawings, but same or similar components are given the same or similar reference numerals, and redundant descriptions thereof will be omitted. The suffixes "module" and/or "part" for components used in the following description are given or interchanged in consideration of only the ease of drafting the specification, and do not have meanings or roles distinct from each other by themselves. In addition, in describing the embodiments disclosed in the present specification, when it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, do not limit the technical ideas disclosed in the present specification, and should be understood to include all changes, equivalents or substitutes included in the spirit and scope of the present disclosure.

The terms including an ordinal number, such as first, second, etc., may be used to describe various components, but the components are not limited by the terms. These terms are used only for the purpose of distinguishing one component from another.

It will be further understood that the terms "comprises" and/or "comprising," when used in the present specification, specify the presence of stated features, integers, steps, operations, components, and/or parts, but do not preclude the presence or addition of one or more other features, integers, steps, operations, components, parts, and/or combinations thereof.

A program implemented as a set of instructions embodying a control algorithm necessary to control another configuration may be installed in a configuration controlling another configuration under a specific control condition among configurations according to an embodiment. The control configuration may process input data and stored data according to the installed program to generate output data. The control configuration may include a non-volatile memory to store a program and a memory to store data.

FIG. 1 is a block diagram schematically illustrating a configuration of a call dispatch control system according to an embodiment.

Referring to FIG. 1, the call dispatch control system 1 includes a call server 10, a taxi terminal 20, a vehicle 30, and a user terminal 40.

The call server 10, the taxi terminal 20, and the user terminal 40 are connected to each other over a network. The taxi terminal 20 may be a vehicle terminal installed in the vehicle 30 operating as a taxi. In the specification, a vehicle in which the taxi terminal 20 is installed is described as a taxi, but this is for convenience of description and the invention is not limited thereto. The call dispatch control system 1 is not limited to a name and may include a terminal of a vehicle that receives a call dispatch from the call server 10 and provides a mobility service connecting a passenger and a driver. For example, the mobility service may include car-hailing, ride-sharing, etc. Hereinafter, it will be described that the terminal of the vehicle that receives the call dispatch from the call server 10 and provides the mobility service is the taxi terminal 20.

The call server 10 may receive a call request from the user terminal 40, match the user terminal 40 that has requested a call to the vehicle based on a signal received from the taxi terminal 20, and dispatch the call of the user terminal 40 to the taxi terminal 20. Although one user terminal 40 is illustrated in FIG. 1, this is for convenience of description, and a plurality of user terminals may request calls from the call server 10.

When receiving the call request signal from the user terminal 40, the call server 10 may match one taxi (hereinafter, a matching taxi) among a plurality of taxis corresponding to a plurality of taxi terminals (hereinafter, candidate taxi terminals) that may match the user terminal 40, based on current location information of the user terminal 40 and destination information of a user. The taxi terminals belonging to the candidate taxi terminals may be changed in real time, and the call server 10 may update the candidate taxi terminals at a predetermined period. The call server 10 may transmit vehicle-related information of the matching taxi to the user terminal 40. An application 41 may provide a screen indicating the vehicle-related information of the matching taxi to the user through the user terminal 40. The user may select whether to use the matching taxi through the user terminal 40.

The application 41 is installed in the user terminal 40. When the user terminal 40 transmits the selected result to the call server 10 and is connected to the matching taxi through the call server 10, the call server 10 may dispatch the matching taxi to the user terminal 40. When the call server 10 dispatches the call to the matching taxi, the vehicle-related information about the matching taxi to which the call is dispatched may be transmitted to the user terminal 40. The vehicle-related information may include identification information of a matching taxi and identification information of the taxi terminal 20 corresponding to the matching taxi. The identification information of the matching taxi may include a vehicle number of the matching taxi, a vehicle type of the matching taxi, etc. The identification information of the taxi terminal 20 may include a phone number of the taxi terminal 20, driver-related information about a matching taxi driver, etc. Hereinafter, if the taxi terminal 20 is included in the candidate taxi terminals, it is assumed that the matching taxi is the vehicle 30.

Hereinafter, the call server 10' dispatching the call of the user terminal 40 to the taxi terminal 20' may mean that the call server 10 determines the vehicle 30 as the matching taxi, the user of the user terminal 40 selects to use the matching taxi, the call server 10 receives a matching taxi selection from the user terminal 40, and the call server 10 dispatches the call to the taxi terminal 20.

At least one of a call application 210, a controller 220, a meter application 230, and a navigation application 240 may be installed in the taxi terminal 20. The controller 220 may transmit/receive a signal to each of the call application 210, the meter application 230, and the navigation application 240.

An input unit (not shown) of the taxi terminal 20 may receive a signal from the driver and transmit the input signal to at least one of the call application 210, the controller 220, the meter application 230, and the navigation application 240. An output unit (not shown) of the taxi terminal 20 may provide a screen displaying each of the call application 210, the controller 220, the meter application 230, and the navigation application 240. The input unit and the output unit of the taxi terminal 20 may be implemented as an all-in-one display included in a display capable of one touch input.

The taxi terminal 20 may include an audio video navigation telematics (AVNT) device. The call application 210, the controller 220, the meter application 230, and the navigation application 240 may be installed and executed in the AVNT device, and the AVNT device may be a device capable of transmitting a signal generated by each application and location information of the taxi terminal 20 to the outside over a network. The AVNT device may transmit a request for information requested from the outside and information necessary for providing a driving service to the outside through communication with a network, and may receive an information request for the taxi terminal 20 and information necessary for providing a service. Hereinafter, the AVNT device transmitting and receiving data with the outside will be described as the taxi terminal 20 transmitting and receiving data with the outside.

When the taxi terminal 20 receives the call dispatch from the call server 10, a taxi transportation operator (hereinafter, referred to as a driver) operating the vehicle 30 may operate the vehicle 30 to conduct a transportation business. In addition, the driver may conduct the transportation business when a passerby makes a request on the road even without receiving the call dispatch from the call server 10 or when receiving the call dispatch through another server (not shown) that provides a call dispatch service.

The call application 210 may transmit the event information received from the controller 220 to the call server 10. The event information may include information provided from the vehicle 30 as information necessary for determining the call dispatch. The event information may be event information indicating the vehicle 30 is an empty car or driving, or event information indicating an exiting state or an entering state.

When the call server 10 dispatches the call to the taxi terminal 20, the call application 210 may receive information (hereinafter, user information) about the user terminal matched to the vehicle 30 by the call dispatch. The user information may include identification information of the user terminal matched to the vehicle 30 and information of departure and destination of the call. When receiving the user information, the call application 210 may provide a screen displaying the user information through the taxi terminal 20.

The meter application 230 may calculate a location, a movement distance, a movement time, etc. of the vehicle 30 based on GPS information of the vehicle 30, and calculate a taxi operation fee accordingly. The meter application 230 may transmit a rate plan information inquiry signal of a specific place to a control center (not shown) that manages a rate policy of the local government. The meter application 230 may be implemented as an app meter (application-type meter). The meter application 230 may provide a screen for inputting a signal indicating that an existing passenger has exited (hereinafter, an empty car signal) or a signal indicating that a passenger has entered (hereinafter, a driving signal) through the taxi terminal 20. The driver may selectively input the empty car signal or the driving signal through the taxi terminal 20.

When driving a taxi without receiving a call dispatch by the call server 10, the driver may input whether the vehicle 30 starts driving or is an empty car into the meter application 230 through the taxi terminal 20 in order to calculate a driving fee. The driver may input the driving signal to the taxi terminal 20 when a passenger enters the vehicle 30 and input the empty car signal to the taxi terminal 20 when the passenger exits the vehicle 30.

When the driver inputs the empty car signal through the taxi terminal 20, the meter application 230 may transmit event information indicating the empty car to the controller 220. When the driver inputs the driving signal through the taxi terminal 20, the meter application 230 may transmit event information indicating that the vehicle 30 is driving to the controller 220. When receiving the event information indicating the vehicle 30 is the empty car or the event information indicating that the vehicle 30 is driving from the meter application 230, the controller 220 may transmit the corresponding event information to the call application 210. When receiving the event information indicating the vehicle 30 is the empty car or the event information indicating that the vehicle 30 is driving from the controller 220, the call application 210 may transmit the corresponding event information to the call server 10 through the taxi terminal 20.

The navigation application 240 may provide a screen for inputting destination information of the passenger through the taxi terminal 20. The driver may input the destination information of the passenger through the taxi terminal 20. Alternatively, when a call of another user terminal is dispatched from the call server 10, the destination information received by the taxi terminal 20 from the call server 10 may be transmitted to the navigation application 240 through the call application 210.

When the destination information is input or the destination information is received, the navigation application 240 may search for a route from the current location of the vehicle 30 or the departure of the call to the destination. The navigation application 240 may provide a screen indicating the found route through the taxi terminal 20. Here, the current location is a location of the vehicle 30 or the taxi terminal 20 at any time during a period from a time when the destination information is input to the navigation application 240 from the input unit of the taxi terminal 20 or the navigation application 240 receives the destination information from the controller 220 to a time when the destination is set in the navigation application 240. Hereinafter, 'setting the destination in the navigation application 240' may mean that the navigation application 240 provides the screen indicating the found route through the taxi terminal 20.

When the destination is set, the navigation application 240 may transmit information (hereinafter, arrival information) indicating an estimated time required to arrive at the destination, the remaining distance to arrive at the destination, etc. to the controller 220. When receiving the arrival information, the controller 220 may transmit the arrival information to the call application 210. When receiving the arrival information from the controller 220, the call application 210 may transmit the arrival information to the call server 10 through the taxi terminal 20.

The vehicle 30 may include an internal sensor 310. The internal sensor 310 may include an acceleration sensor, a vehicle speed sensor, an accelerator pedal sensor (APS), a brake pedal sensor (BPS), a seat pressure sensor, a seat belt fastening sensor, a door sensor, a shift gear sensor, a camera for photographing the interior of the vehicle 30, etc. In addition, a signal output from the internal sensor 310 may include a plurality of signals (hereinafter, a plurality of sensor signals), such as an accelerator detection signal that detects the position of an accelerator pedal and outputs a signal indicating an operation of the accelerator pedal, a brake detection signal detecting the position of a brake pedal and outputting a signal indicating the operation (step) of a brake, a vehicle speed sensor signal indicating the speed of the vehicle 30, an acceleration sensor signal indicating the acceleration of the vehicle 30, a signal indicating the seat pressure, a signal indicating the opening/closing state of the door of the vehicle 30, a signal indicating the position of a shift gear, etc. The acceleration of the vehicle 30 may represent a speed change rate of the vehicle 30, and the position of the shift gear may represent one of shift stages, such as P (parking), R (reverse), N (neutral), and D (drive). The taxi terminal 20 may receive the plurality of sensor signals output from the internal sensor 310.

The meter application 230 may provide a screen for selecting whether to turn on or off an empty vehicle indicator lamp (hereinafter, empty vehicle lamp) indicating whether the vehicle 30 is empty or not through the taxi terminal 20. The driver may select to turn on or off the empty car lamp through the taxi terminal 20. When the driver selects to turn on or off the empty vehicle lamp, the meter application 230 may transmit an empty vehicle lamp signal indicating whether to turn on or off the empty vehicle lamp to the controller 220. The controller 220 may control to turn on or off the empty vehicle lamp based on the empty vehicle lamp signal.

The controller 220 may determine whether the passenger is in a state of exiting from the vehicle 30 (hereinafter, referred to as an exiting state) or whether the passenger is in a state of entering the vehicle 30 (hereinafter, an entering state) based on vehicle information according to the received plurality of sensor signals and the empty vehicle lamp signal. The vehicle information may include whether the empty vehicle lamp of the vehicle 30 turns on, a time when the door is opened or closed, whether the seat pressure sensor exceeds a predetermined threshold, driving information such as the speed of the vehicle 30, acceleration, the position of the shift gear, etc., whether the vehicle 30 is in the exiting state or entering state based on whether a seat belt is fastened, etc. In addition, the controller 220 may determine whether a passenger is present in the vehicle 30 based on an image generated by the camera photographing the interior of the vehicle 30.

When the vehicle 30 is in the exiting state, the controller 220 may transmit event information indicating the exiting state to the call application 210, and when the vehicle 30 is in the entering state, transmit event information indicating the entering state to the call application 210. When receiving the event information indicating the exiting state or the event information indicating the entering state from the controller 220, the call application 210 may transmit the corresponding event information to the call server 10 through the taxi terminal 20.

The call server 10 may dispatch the call to the taxi terminal 20 when the event information received from the taxi terminal 20 indicates the empty car or the exiting state. When the received event information indicates the empty car or the exiting state, the call server 10 may include the taxi terminal 20 in the candidate taxi terminals. When the event information received from the taxi terminal 20 indicates that the vehicle 30 is driving or indicates the entering state, the call server 10 may not dispatch the call to the taxi terminal 20. When the received event information indicates that the vehicle 30 is driving or indicates the entering state, the call server 10 may exclude the taxi terminal 20 from the candidate taxi terminals.

When receiving the arrival information from the taxi terminal 20, the call server 10 may dispatch the call to the taxi terminal 20 at any time during a period from when the vehicle 30 starts operating before arriving at the destination based on at least one of the estimated time required to arrive at the destination and the remaining distance to arrive at the destination. The any time may be a time when the current location of the vehicle 30 falls within a range within a predetermined distance from the destination or a time when the estimated time required to arrive at the destination from the current time falls within a range within a predetermined time. Here, the current time may be any time during the period from when the call server 10 receives the arrival information from the taxi terminal 20 to the time when the call server 10 dispatches the call to the taxi terminal 20. Alternatively, the call server 10 may include the taxi terminal 20 in the candidate taxi terminals at any time during the period from when the vehicle 30 starts operating before arriving at the destination.

Figure 2:
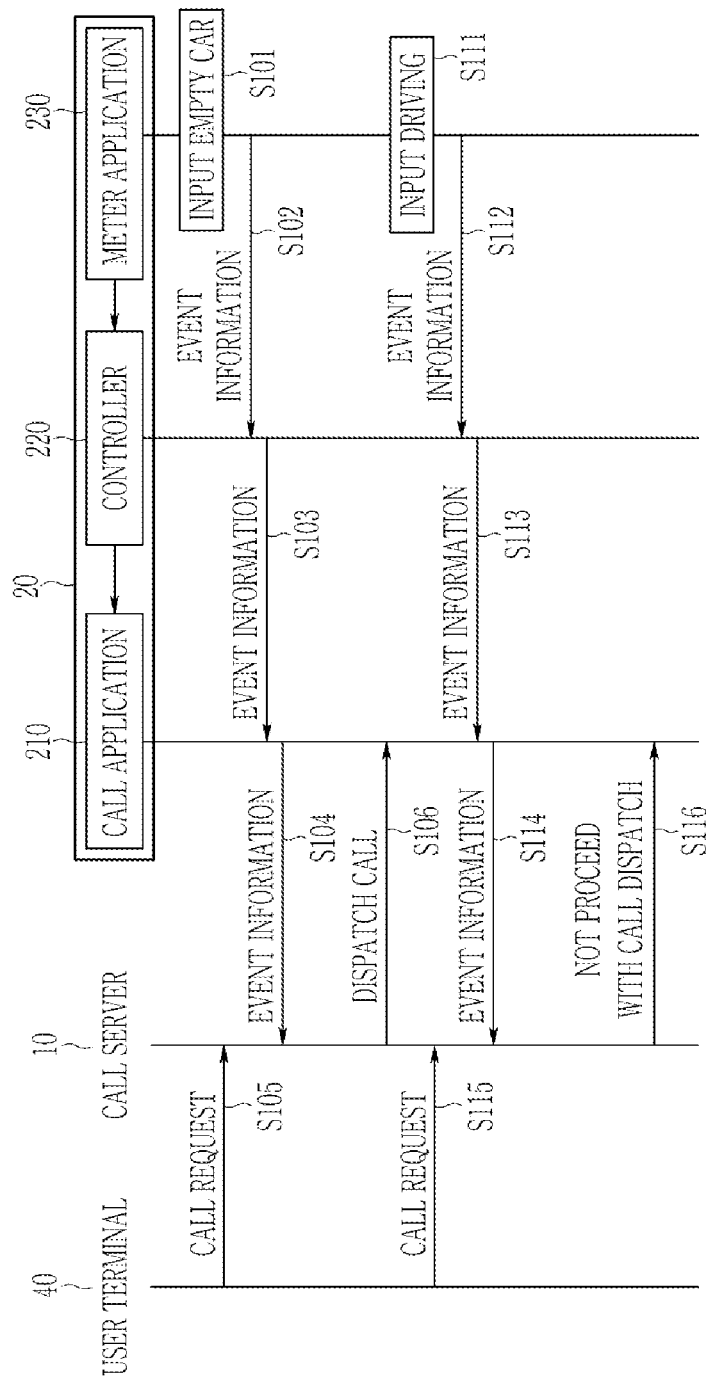
FIG. 2 is a flowchart of a call dispatch control service providing method according to an embodiment due to an input of a meter application.

FIG. 2 is a flowchart of a call dispatch control service providing method according to an embodiment due to an input of a meter application.

The meter application 230 may provide a screen for inputting an empty car signal indicating that an existing passenger has exited or a driving signal indicating that a passenger has entered through the taxi terminal 20. The driver may input the empty car signal through the taxi terminal 20 (S101).

When the driver inputs the empty car signal, the meter application 230 may generate and transmit event information indicating an empty car to the controller 220 (S102), and the controller 220 may transmit the received event information indicating the empty car to the call application 210 (S103). The call application 210 may transmit the received event information to the call server 10 (S104). When receiving a call request from the user terminal 40 (S105), and receiving the event information indicating the empty car from the taxi terminal 20, the call server 10 may dispatch a call of the user terminal 40 to the taxi terminal 20 (S106). Alternatively, in step S106, when receiving the event information indicating the empty car from the taxi terminal 20, the call server 10 may include the taxi terminal 20 in the candidate taxi terminals.

Alternatively, the meter application 230 may input a driving signal through the taxi terminal 20 on the screen provided through the taxi terminal 20 (S111).

When the driver inputs the driving signal, the meter application 230 may generate and transmit event information indicating that the vehicle 30 is driving to the controller 220 (S112), and the controller 220 may transmit the received event information indicating that the vehicle 30 is driving to the call application 210 (S113). The call application 210 may transmit the received event information to the call server 10 through the taxi terminal 20 (S114). When receiving the call request from the user terminal 40 (S115) and receiving the event information indicating that the vehicle 30 is driving from the taxi terminal 20, the call server 10 may not proceed with the call dispatch to the taxi terminal 20 (S116). Alternatively, in step S116, when receiving the event information indicating that the vehicle 30 is driving from the taxi terminal 20, the call server 10 may exclude the taxi terminal 20 from the candidate taxi terminals.

Figure 3:
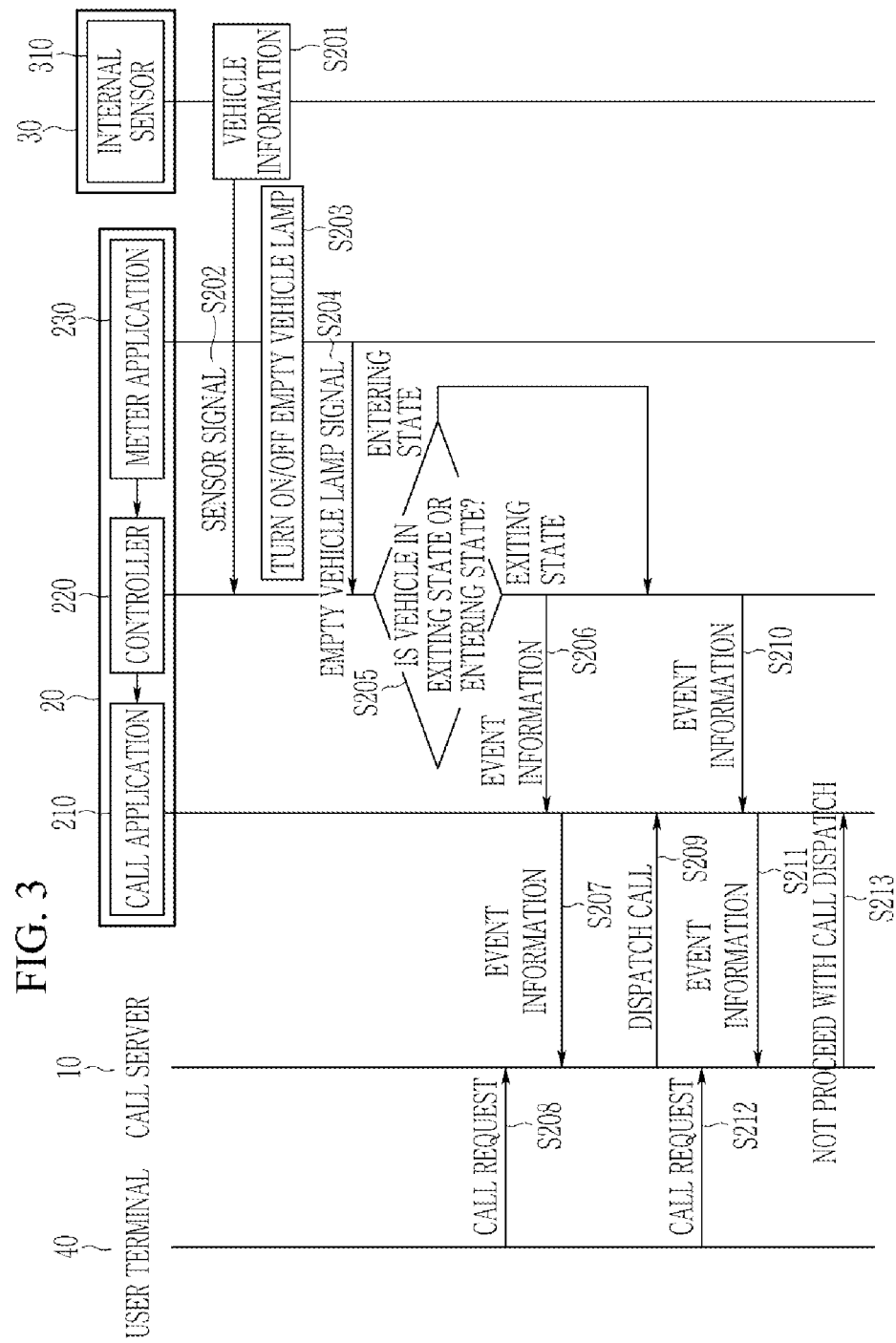
FIG. 3 is a flowchart of a call dispatch control service providing method according to an embodiment due to the reception of a vehicle sensor signal.

FIG. 3 is a flowchart of a call dispatch control service providing method according to an embodiment due to the reception of a vehicle sensor signal.

The internal sensor 310 may generate a plurality of sensor signals based on vehicle information (S201). The internal sensor 310 may transmit the plurality of sensor signals to the taxi terminal 20 (S202).

When the meter application 230 provides a screen for selecting whether to turn on or off an empty vehicle lamp through the taxi terminal 20, the driver may select to turn on or off the empty vehicle lamp through the taxi terminal 20. When the driver selects to turn on or off the empty vehicle lamp (S203), the meter application 230 may transmit an empty vehicle lamp signal according to a selection of the user to the controller 220 (S204).

When the taxi terminal 20 receives the plurality of sensor signals, and the controller 220 receives the empty vehicle lamp signal, the controller 220 may determine whether the vehicle 30 is in an exiting state or an entering state based on at least one of vehicle information according to the received plurality of sensor signals and the empty vehicle lamp signal (S205). For example, when the seat pressure of at least one of seats other than the driver's seat of the vehicle 30 exceeds a predetermined threshold or when at least one seat belt of the remaining seats is fastened, the controller 220 may determine that the vehicle 30 is in the entering state. In addition, when at least one of doors other than the driver's door of the vehicle 30 is opened and closed and then a shift gear is positioned at the P (parking) stage, the controller 220 may determine that the vehicle 30 is in the exiting state.

If it is determined that the vehicle 30 is in the exiting state, the controller 220 may generate event information indicating the exiting state and transmit the event information to the call application 210 (S206).

The call application 210 may transmit the received event information to the call server 10 through the taxi terminal 20 (S207).

When receiving a call request from the user terminal 40 (S208), and receiving the event information indicating the exiting state from the taxi terminal 20, the call server 10 may dispatch a call of the user terminal 40 to the taxi terminal 20 (S209). Alternatively, in step S209, upon receiving the event information indicating the exiting state from the taxi terminal 20, the call server 10 may include the taxi terminal 20 in the candidate taxi terminals.

If it is determined that the vehicle 30 is in the entering state, the controller 220 may generate event information indicating the entering state and transmit the event information to the call application 210 (S210).

The call application 210 may transmit the received event information to the call server 10 through the taxi terminal 20 (S211).

When receiving a call request from the user terminal 40 (S212), and receiving the event information indicating the entering state from the taxi terminal 20, the call server 10 may not proceed with the call dispatch to the taxi terminal 20 (S213). Alternatively, in step S213, when receiving event information indicating the entering state from the taxi terminal 20, the call server 10 may exclude the taxi terminal 20 from the candidate taxi terminals.

Figure 4:
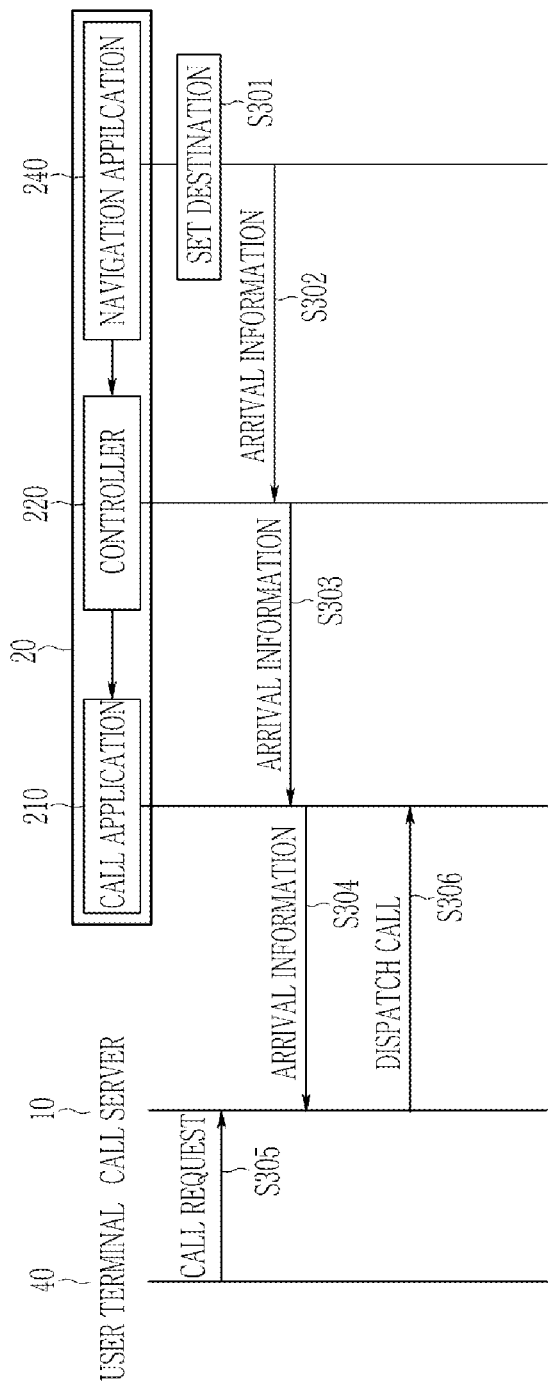
FIG. 4 is a flowchart of a call dispatch control service providing method according to an embodiment due to setting of a navigation destination.

FIG. 4 is a flowchart of a call dispatch control service providing method according to an embodiment due to setting of a navigation destination.

A destination may be set in the navigation application 240 (S301). When the destination is set, the navigation application 240 may generate and transmit arrival information to the controller 220 (S302), and the controller 220 may transmit the received arrival information to the call application 210 (S303).

The call application 210 may transmit the received arrival information to the call server 10 through the taxi terminal 20 (S304).

The call server 10 may monitor an estimated time required to arrive at the destination and the remaining distance to arrive at the destination based on the arrival information.

When receiving a call request from the user terminal 40 (S305), based on a monitoring result, the call server 10 may dispatch a call of the user terminal 40 to the taxi terminal 20 at any time during a period from when the vehicle 30 starts operating before arriving at the destination (S306).

The call server 10 may dispatch a call near the destination of the vehicle 30 to the taxi terminal 20 based on the arrival information received in step S304. For example, when an estimated arrival time of the vehicle 30 at the destination is 10 minutes after the current time, the call server 10 may dispatch the call of the user terminal 40 to the taxi terminal 20. Alternatively, in step S306, the call server 10 may include the taxi terminal 20 in the candidate taxi terminals at any time during the period from when the vehicle 30 starts operating before arriving at the destination.

The call server 10 may dispatch a call having a departure as an area within a predetermined distance with respect to the destination of the vehicle 30 to the taxi terminal 20. Here, the predetermined distance may be determined based on an estimated time for the vehicle 30 to arrive at the destination. For example, when a call is dispatched to the taxi terminal 20 10 minutes before the vehicle 30 arrives at the destination, the call server 10 may determine a distance that may be moved within 5 minutes from the destination through the vehicle as the predetermined distance. When a call is dispatched to the taxi terminal 20 5 minutes before the vehicle 30 arrives at the destination, the call server 10 may determine a distance that may be moved within 10 minutes from the destination through the vehicle as the predetermined distance.

Although the embodiments of the present invention have been described in detail above, the scope of the present invention is not limited thereto, and various modifications and improvements made by a person of an ordinary skill in the field to which the present invention pertains also belong to the scope of the present invention.

What is claimed is:

1. A method for providing a call dispatch control service, the method comprising:
   operating a vehicle as a taxi;
   receiving, by a call server, event information from a taxi terminal corresponding to an empty car signal indicating that a disembarking passenger has exited the vehicle or a driving signal indicating that a boarding passenger has entered the vehicle;
   receiving, by the call server, a call request from a user terminal; and
   determining, by the call server, whether to dispatch the call request to the taxi terminal based on whether the event information is the empty car signal or the driving signal,
   wherein the method further comprises:
   dispatching, by the call server, the call request to the taxi terminal in response to the event information being the empty car signal, and
   excluding, by the call server, the taxi terminal from candidate taxi terminals that may match with the user terminal based on current location information of the user terminal and destination information of a user, in response to the event information being that the vehicle is in a driving state.

2. The method of claim 1, further comprising:
   receiving, by the call server, additional event information indicating an entering state of the boarding passenger or an exiting state of the disembarking passenger from the taxi terminal based on a determination by the taxi terminal that the vehicle is in the entering state or the exiting state in consideration of a sensor signal and whether an empty vehicle lamp of the vehicle is on,
   wherein the sensor signal is an indication of a position of an accelerator pedal, a speed of the vehicle, an acceleration of the vehicle, a seat pressure, an opening/closing state of a vehicle door, or a position of a shift gear received from an internal sensor of the vehicle.

3. The method of claim 2, further comprising:
   dispatching, by the call server, the call request to the taxi terminal, in response to the additional event information indicating the exiting state.

4. The method of claim 3, further comprising:
   excluding, by the call server, the taxi terminal from the candidate taxi terminals that may match with the user terminal based on the current location information of the user terminal and the destination information of the user, in response to the additional event information indicating the entering state.

5. The method of claim 1, further comprising:
   receiving, by the call server, additional event information indicating an entering state of the boarding passenger or an exiting state of the disembarking passenger from the taxi terminal based on a determination by the taxi terminal that the vehicle is in the entering state or the exiting state in consideration of at least three sensor signals and whether an empty vehicle lamp of the vehicle is on,
   wherein the at least three sensor signals respectively comprise an indication of a position of an accelerator pedal, a speed of the vehicle, an acceleration of the vehicle, a seat pressure, an opening/closing state of a vehicle door, or a position of a shift gear received from an internal sensor of the vehicle.

6. The method of claim 1, further comprising:
   receiving, by the call server, information indicating an estimated time required to arrive at a destination set in a navigation application installed in the taxi terminal and a remaining distance to arrive at the destination from the taxi terminal; and
   dispatching, by the call server, the call request to the taxi terminal at any time during a period from when the taxi terminal starts operating before arriving at the destination.

7. A call dispatch control system, the system comprising:
   a vehicle that operates as a taxi;
   a taxi terminal located in the vehicle, having a plurality of applications installed, and configured to generate event information based on a signal input by a driver or a signal received from an internal sensor of the vehicle; and
   a call server configured to:
   determine whether to dispatch a call request to the taxi terminal based on whether the event information is first event information indicating an empty car, second event information indicating that the vehicle is in an exiting state in which a disembarking passenger has exited the vehicle, third event information indicating that the vehicle is in a driving state, or fourth event information indicating that the vehicle is in an entering state in which a boarding passenger has entered the vehicle;

dispatch the call request to the taxi terminal in response to the event information being the first event information or the second event information; and exclude the taxi terminal from candidate taxi terminals that may match with a user terminal based on current location information of the user terminal and destination information of a user in response to the event information being the third event information or the fourth event information.

8. The system of claim 7, wherein the plurality of applications comprises:
a meter application configured to:
calculate a taxi operation fee according to a location, a movement distance, and a movement time of the vehicle based on GPS information of the vehicle; and
generate the first event information in response to an empty car signal indicating that the disembarking passenger has exited the vehicle being input through the taxi terminal; and
a call application configured to transmit the first event information to the call server through the taxi terminal in response to receiving the first event information from a controller.

9. The system of claim 8, wherein the controller is configured to:
receive a sensor signal indicating a position of an accelerator pedal, a speed of the vehicle, an acceleration of the vehicle, a seat pressure, an opening/closing state of a vehicle door, or a position of a shift gear from the internal sensor;
receive an empty vehicle lamp signal indicating whether to turn on an empty vehicle lamp of the vehicle from the meter application; and
determine whether the vehicle is in the entering state in which the boarding passenger is entering the vehicle or whether the vehicle is in the exiting state in which the disembarking passenger is exiting the vehicle based on the sensor signal and the empty vehicle lamp signal.

10. The system of claim 8, wherein the controller is configured to:
receive at least three sensor signals, each of the sensor signals respectively indicating a position of an accelerator pedal, a speed of the vehicle, an acceleration of the vehicle, a seat pressure, an opening/closing state of a vehicle door, or a position of a shift gear from the internal sensor;
receive an empty vehicle lamp signal indicating whether to turn on an empty vehicle lamp of the vehicle from the meter application; and
determine whether the vehicle is in the entering state in which the boarding passenger is entering the vehicle or whether the vehicle is in the exiting state in which the disembarking passenger is exiting the vehicle based on the sensor signals and the empty vehicle lamp signal.

11. The system of claim 7, wherein the plurality of applications comprises:
a navigation application configured to provide:
a first screen for inputting the destination information of the boarding passenger through the taxi terminal; and a second screen indicating a route to an input destination through the taxi terminal.

12. The system of claim 11, wherein the call server is further configured to:
receive information indicating an estimated time required to arrive at a destination set in the navigation application and a remaining distance to arrive at the destination; and
dispatch the call request to the taxi terminal at any time during a period from when the taxi terminal starts operating before arriving at the destination.

13. A method for providing a call dispatch control service, the method comprising:
operating a vehicle as a taxi;
receiving, by a taxi terminal, an empty car signal indicating that a disembarking passenger has gotten off or a driving signal indicating that a boarding passenger has gotten on from a driver of the vehicle;
transmitting, by the taxi terminal, event information to a call server; and
receiving, by the taxi terminal, a call request from the call server based on the call request from a user terminal when the event information is the empty car signal,
wherein, when the event information indicates that the vehicle is in a driving state, the taxi terminal is excluded from candidate taxi terminals that may match with the user terminal based on current location information of the user terminal and destination information of a user.

14. The method of claim 13, further comprising:
receiving, by the taxi terminal, a sensor signal indicating a position of an accelerator pedal, a speed of the vehicle, an acceleration of the vehicle, a seat pressure, an opening/closing state of a vehicle door, or a position of a shift gear from an internal sensor of the vehicle;
determining, by the taxi terminal, whether the vehicle is in an entering state in which the boarding passenger is entering the vehicle or the vehicle is in an exiting state in which the disembarking passenger is exiting the vehicle, based on the sensor signal and whether an empty vehicle lamp of the vehicle turns on; and
transmitting, by the taxi terminal, additional event information indicating the entering state or the exiting state to the call server according to a determination result.

15. The method of claim 14, further comprising receiving, by the taxi terminal, the call request from the call server, when the additional event information indicates the exiting state.

16. The method of claim 15, wherein the taxi terminal is excluded from the candidate taxi terminals that may match with the user terminal based on the current location information of the user terminal and the destination information of the user when the additional event information indicates the entering state.

17. The method of claim 13, further comprising:
obtaining information indicating an estimated time required to arrive at a destination set in a navigation application installed in the taxi terminal and a remaining distance to arrive at the destination; and
receiving, by the taxi terminal, the call request from the call server at any time during a period from when the taxi terminal starts operating before arriving at the destination.

* * * * *